US012679759B2

(12) United States Patent
Nagano

(10) Patent No.: US 12,679,759 B2
(45) Date of Patent: Jul. 14, 2026

(54) STRENGTHENED GLASS PLATE AND GLASS PLATE FOR STRENGTHENING

(71) Applicant: Nippon Electric Glass Co., Ltd., Shiga (JP)

(72) Inventor: Yuta Nagano, Shiga (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 184 days.

(21) Appl. No.: 17/795,781

(22) PCT Filed: Dec. 22, 2020

(86) PCT No.: PCT/JP2020/047851
§ 371 (c)(1),
(2) Date: Jul. 27, 2022

(87) PCT Pub. No.: WO2021/171761
PCT Pub. Date: Sep. 2, 2021

(65) Prior Publication Data
US 2023/0083077 A1 Mar. 16, 2023

(30) Foreign Application Priority Data

Feb. 25, 2020 (JP) ................................. 2020-029131
Oct. 1, 2020 (JP) ................................. 2020-166644

(51) Int. Cl.
| C03C 3/083 | (2006.01) |
| C03B 17/06 | (2006.01) |
| C03C 3/091 | (2006.01) |
| C03C 3/097 | (2006.01) |
| C03C 21/00 | (2006.01) |

(52) U.S. Cl.
CPC ............ *C03C 3/091* (2013.01); *C03B 17/064* (2013.01); *C03C 3/097* (2013.01); *C03C 21/002* (2013.01)

(58) Field of Classification Search
CPC .......... C03C 3/083; C03C 3/091; C03C 3/097
See application file for complete search history.

(56) References Cited

U.S. PATENT DOCUMENTS

| 2006/0063009 A1 | 3/2006 | Naitou et al. |
| 2010/0119846 A1* | 5/2010 | Sawada ................... C03C 3/093 |
| | | 65/30.1 |
| 2011/0045961 A1 | 2/2011 | Dejneka et al. |
| 2011/0294648 A1 | 12/2011 | Chapman et al. |

| 2012/0052271 A1 | 3/2012 | Gomez et al. |
| 2015/0147575 A1 | 5/2015 | Dejneka et al. |
| 2015/0329406 A1 | 11/2015 | Kawamoto et al. |
| 2017/0183255 A1 | 6/2017 | Walther et al. |
| 2019/0161402 A1* | 5/2019 | Harris ................... C03C 21/002 |

FOREIGN PATENT DOCUMENTS

| JP | 2006-83045 | 3/2006 |
| JP | 2013-502370 | 1/2013 |
| JP | 2013-533838 | 8/2013 |
| JP | 2013-536155 | 9/2013 |
| JP | 2015-61808 | 4/2015 |
| JP | 2016-667 | 1/2016 |
| JP | 2016-537290 | 12/2016 |
| JP | 2017-529305 | 10/2017 |
| WO | 2015/031188 | 3/2015 |
| WO | 2019/219009 | 11/2019 |

OTHER PUBLICATIONS

International Search Report dated Feb. 22, 2021 in corresponding International Application No. PCT/JP2020/047851.
Tetsuro Izumitani et al., "New glass and physical properties thereof," First edition, Management System Laboratory. Co., Ltd., Aug. 20, 1984, pp. 451-498, with partial English translation.
International Preliminary Report on Patentability and Written Opinion of the International Searching Authority issued Aug. 30, 2022 in International (PCT) Patent Application No. PCT/JP2020/047851.
Office Action issued Oct. 9, 2025 in corresponding Chinese Patent Application No. 202080089790.9, with English-language Translation.
Zhou Zhang Jian et al., "Inorganic Non-metallic Materials Technology", China Light Industry Press, First Edition, First Printing, Jan. 2010, p. 350; Cited in CA.
Notice of Reasons for Refusal issued Dec. 18, 2024 in corresponding Japanese Patent Application No. 2022-503116, with English-language Translation.

* cited by examiner

*Primary Examiner* — Joanna Pleszczynska
(74) *Attorney, Agent, or Firm* — Wenderoth, Lind & Ponack, L.L.P.

(57) ABSTRACT

A tempered glass sheet of the present invention is a tempered glass sheet having a compressive stress layer in a surface thereof, wherein the tempered glass sheet comprises as a glass composition, in terms of mol %, 50% to 75% of $SiO_2$, 1% to 20% of $Al_2O_3$, 5% to 30% of $B_2O_3$, 0% to 15% of $Li_2O$, 1% to 25% of $Na_2O$, 0% to 10% of $K_2O$, and 0% to 15% of $P_2O_5$, wherein the tempered glass sheet has a molar ratio $[Al_2O_3]/[Na_2O]$ of from 0.1 to 2.5, and wherein the tempered glass sheet satisfies the following relationship:

$$[SiO_2]-3\times[Al_2O_3]-[B_2O_3]-2\times[Li_2O]-1.5\times[Na_2O]-[K_2O]+1.2\times[P_2O_5]\geq-20\%.$$

15 Claims, No Drawings

STRENGTHENED GLASS PLATE AND GLASS PLATE FOR STRENGTHENING

TECHNICAL FIELD

The present invention relates to a tempered glass sheet and a glass sheet to be tempered, and more particularly, to a tempered glass sheet and a glass sheet to be tempered suitable as a cover glass for a foldable display or the like.

BACKGROUND ART

In recent years, a foldable display that is foldable has appeared on the market, and investigations have been made on using a cover glass for protecting the display.

A tempered glass obtained through ion exchange treatment is generally used as the cover glass (see Patent Literatures 1 and 2, and Non Patent Literature 1).

CITATION LIST

Patent Literature

Patent Literature 1: JP 2006-83045 A
Patent Literature 2: WO 2015/031188 A1

Non Patent Literature

Non Patent Literature 1: Tetsuro Izumitani et al., "New glass and physical properties thereof," First edition, Management System Laboratory. Co., Ltd., Aug. 20, 1984, p. 451-498

SUMMARY OF INVENTION

Technical Problem

A cover glass for a foldable display is required to have a low Young's modulus and a high compressive stress value of a compressive stress layer on an outermost surface. When the Young's modulus is low, a tensile stress that is generated in a bent portion of the cover glass at the time of bending the flexible display can be reduced. In addition, when the compressive stress value of the compressive stress layer on the outermost surface is high, breakage resulting from the tensile stress that is generated in the bent portion of the cover glass at the time of bending the flexible display can be easily prevented. As a result, when both of the low Young's modulus and the high compressive stress value of the compressive stress layer on the outermost surface are achieved, the cover glass is less liable to undergo breakage at the time of bending the flexible display.

In addition, a manufacturing process for the flexible display includes a step of subjecting the cover glass to acid treatment, but when the cover glass has low acid resistance, the cover glass undergoes opacification, with the result that its visibility is reduced.

The present invention has been made in view of the above-mentioned circumstances, and a technical object of the present invention is to devise a tempered glass sheet and a glass sheet to be tempered each having satisfactory acid resistance and being capable of achieving both of a low Young's modulus and a high compressive stress value of a compressive stress layer on an outermost surface.

Solution to Problem

The inventor of the present invention has made various investigations, and as a result, has found that, when a glass composition is strictly restricted, the above-mentioned technical object can be achieved. Thus, the finding is proposed as the present invention. That is, according to one embodiment of the present invention, there is provided a tempered glass sheet having a compressive stress layer in a surface thereof, wherein the tempered glass sheet comprises as a glass composition, in terms of mol %, 50% to 75% of $SiO_2$, 1% to 20% of $Al_2O_3$, 5% to 30% of $B_2O_3$, 0% to 15% of $Li_2O$, 1% to 25% of $Na_2O$, 0% to 10% of $K_2O$, and 0% to 15% of $P_2O_5$, wherein the tempered glass sheet has a molar ratio $[Al_2O_3]/[Na_2O]$ of from 0.1 to 2.5, and wherein the tempered glass sheet satisfies the following relationship:

$$[SiO_2]-3\times[Al_2O_3]-[B_2O_3]-2\times[Li_2O]-1.5\times[Na_2O]-[K_2O]+1.2\times[P_2O_5]\geq-20\%.$$

Herein, the "$[SiO_2]$" represents the content (mol %) of $SiO_2$, the "$[Al_2O3]$" represents the content (mol %) of $Al_2O_3$, the "$[B_2O_3]$" represents the content (mol %) of $B_2O_3$, the "$[Li_2O]$" represents the content (mol %) of $Li_2O$, the "$[Na_2O]$" represents the content (mol %) of $Na_2O$, the "$[K_2O]$" represents the content (mol %) of $K_2O$, and the "$[P_2O_5]$" represents the content (mol %) of $P_2O_5$.

In addition, it is preferred that the tempered glass sheet according to the one embodiment of the present invention comprise as a glass composition, in terms of mol %, 50% to 75% of $SiO_2$, 11.7% to 13.5% of $Al_2O_3$, 5% to 30% of $B_2O_3$, 0% to 15% of $Li_2O$, 13% to 16% of $Na_2O$, 0% to 10% of $K_2O$, and 0% to 15% of $P_2O_5$, have a molar ratio $[Al_2O_3]/[Na_2O]$ of from 0.8 to 1.2, and satisfy the following relationship:

$$[SiO_2]-3\times[Al_2O_3]-[B_2O_3]-2\times[Li_2O]-1.5\times[Na_2O]-[K_2O]+1.2\times[P_2O_5]\geq-2.5\%$$

In addition, it is preferred that the tempered glass sheet according to the one embodiment of the present invention comprise as a glass composition, in terms of mol %, 62% to 67% of $SiO_2$, 11.7% to 13.5% of $Al_2O_3$, 8% to 10% of $B_2O_3$, 0% to 15% of $Li_2O$, 13% to 16% of $Na_2O$, 0% to 10% of $K_2O$, and 0% to 15% of $P_2O_5$, have a molar ratio $[Al_2O_3]/[Na_2O]$ of from 0.8 to 1.2, and satisfy the following relationship:

$$[SiO_2]-3\times[Al_2O_3]-[B_2O_3]-2\times[Li_2O]-1.5\times[Na_2O]-[K_2O]+1.2\times[P_2O_5]\geq-2.5\%.$$

In addition, it is preferred that the tempered glass sheet according to the one embodiment of the present invention have a content of $P_2O_5$ of from 0.1 mol % to 15 mol %.

In addition, it is preferred that the tempered glass sheet according to the one embodiment of the present invention have a content of $Li_2O$ of from 0.1 mol % to 15 mol %.

In addition, it is preferred that the tempered glass sheet according to the one embodiment of the present invention have a softening point of 950° C. or less. Herein, the "softening point" refers to a value measured based on a method of ASTM C338.

In addition, it is preferred that the tempered glass sheet according to the one embodiment of the present invention have a temperature at a viscosity at high temperature of $10^{2.5}$ dPa·s of less than 1, 650° C. Herein, the "temperature at a viscosity at high temperature of $10^{2.5}$ dPa·s" refers to a value measured by a platinum sphere pull up method.

In addition, it is preferred that the tempered glass sheet according to the one embodiment of the present invention have a sheet thickness of 100 μm or less.

In addition, it is preferred that the tempered glass sheet according to the one embodiment of the present invention have a rectangular shape with a side of 100 mm or more.

In addition, in the tempered glass sheet according to the one embodiment of the present invention, it is preferred that the compressive stress layer have a compressive stress value of from 200 MPa to 1,100 MPa on an outermost surface.

In addition, in the tempered glass sheet according to the one embodiment of the present invention, it is preferred that the compressive stress layer have a depth of layer of from 10% to 15% of a sheet thickness.

In addition, it is preferred that the tempered glass sheet according to the one embodiment of the present invention comprise overflow-merged surfaces in a middle portion thereof in a sheet thickness direction, that is, the tempered glass sheet be formed by an overflow down-draw method.

In addition, it is preferred that the tempered glass sheet according to the one embodiment of the present invention be used as a cover glass for a flexible display.

According to one embodiment of the present invention, there is provided a glass sheet to be tempered, comprising as a glass composition, in terms of mol %, 50% to 75% of $SiO_2$, 1% to 20% of $Al_2O_3$, 5% to 30% of $B_2O_3$, 0% to 15% of $Li_2O$, 1% to 25% of $Na_2O$, 0% to 10% of $K_2O$, and 0% to 15% of $P_2O_5$, having a molar ratio $[Al_2O_3]/[Na_2O]$ of from 0.1 to 2.5, and satisfying the following relationship:

$$[SiO_2]-3\times[Al_2O_3]-[B_2O_3]-2\times[Li_2O]-1.5\times[Na_2O]-[K_2O]+1.2\times[P_2O_5]\geq-20\%.$$

According to one embodiment of the present invention, there is provided a glass sheet to be tempered, comprising as a glass composition, in terms of mol %, 50% to 75% of $SiO_2$, 1% to 20% of $Al_2O_3$, 5% to 30% of $B_2O_3$, 1% to 25% of $Na_2O$, 0% to 10% of $K_2O$, and 0% to 15% of $P_2O_5$, having a molar ratio $[Al_2O_3]/[Na_2O]$ of from 0.1 to 2.5, satisfying the following relationship:

$$[SiO_2]-3\times[Al_2O_3]-[B_2O_3]-2\times[Li_2O]-1.5\times[Na_2O]-[K_2O]+1.2\times[P_2O_5]\geq-20\%,$$

and having a sheet thickness of less than 100 μm.

DESCRIPTION OF EMBODIMENTS

A tempered glass sheet (glass sheet to be tempered) of the present invention is characterized by comprising as a glass composition, in terms of mol %, 50% to 75% of $SiO_2$, 1% to 20% of $Al_2O_3$, 5% to 30% of $B_2O_3$, 0% to 15% of $Li_2O$, 1% to 25% of $Na_2O$, 0% to 10% of $K_2O$, and 0% to 15% of $P_2O_5$, having a molar ratio $[Al_2O_3]/[Na_2O]$ of from 0.1 to 2.5, and satisfying the following relationship:

$$[SiO_2]-3\times[Al_2O_3]-[B_2O_3]-2\times[Li_2O]-1.5\times[Na_2O]-[K_2O]+1.2\times[P_2O_5]\geq-20\%.$$

Reasons why the content ranges of the components of the tempered glass sheet (glass sheet to be tempered) of the present invention are restricted are described below. In the description of the content range of each component, the expression "%" means "mol %" unless otherwise specified.

$SiO_2$ is a component that forms a glass network. When the content of $SiO_2$ is too small, vitrification does not occur easily, and acid resistance is liable to be reduced. Accordingly, a suitable lower limit of the content range of $SiO_2$ is 50% or more, 52% or more, 54% or more, 55% or more, 57% or more, 59% or more, 60% or more, 61% or more, 62% or more, or 63% or more, particularly 64% or more. Meanwhile, when the content of $SiO_2$ is too large, meltability and formability are liable to be reduced, and a thermal expansion coefficient is excessively reduced, with the result that it becomes difficult to match the thermal expansion coefficient with those of peripheral materials. Accordingly, a suitable upper limit of the content range of $SiO_2$ is 75% or less, 73% or less, 71% or less, 70% or less, 69% or less, 68% or less, 67% or less, or 66% or less, particularly 65% or less.

$Al_2O_3$ is a component that increases an ion exchange rate. The content of $Al_2O_3$ is from 10% to 30%. When the content of $Al_2O_3$ is too small, the ion exchange rate is liable to be reduced. Accordingly, a suitable lower limit of the content range of $Al_2O_3$ is 1% or more, 3% or more, 4% or more, 5% or more, 6% or more, 7% or more, 8% or more, 9% or more, 10% or more, or 11% or more, particularly 11.7% or more. Meanwhile, when the content of $Al_2O_3$ is too large, a devitrified crystal is liable to be precipitated in the glass, and it becomes difficult to form the glass into a sheet shape by an overflow down-draw method or the like. Particularly when the glass is formed into a sheet shape by an overflow down-draw method involving using an alumina refractory as a forming body refractory, a devitrified crystal of spinel is liable to be precipitated at an interface with the alumina refractory. In addition, the acid resistance is reduced, with the result that it becomes difficult to subject the glass to an acid treatment step. Further, the Young's modulus becomes too high. Accordingly, a suitable upper limit of the content range of $Al_2O_3$ is 20% or less, 19% or less, 18% or less, 17% or less, 16% or less, 15% or less, 13.5% or less, or 13% or less, particularly 12% or less.

$B_2O_3$ is a component that reduces the Young's modulus, the viscosity at high temperature, and a density, and that also enhances devitrification resistance. However, when the content of $B_2O_3$ is too large, the ion exchange rate (particularly a depth of layer) is liable to be reduced. In addition, coloring of a glass surface, which is called weathering, is caused by ion exchange, and the acid resistance and water resistance are liable to be reduced. Accordingly, a suitable lower limit of the content range of $B_2O_3$ is 5% or more, 6% or more, 7% or more, 8% or more, or 9% or more, particularly 10% or more. In addition, a suitable upper limit of the content range of $B_2O_3$ is 30% or less, 25% or less, 22% or less, 20% or less, 18% or less, 16% or less, 13% or less, 12% or less, 11% or less, or 10.5% or less, particularly 10% or less.

$Li_2O$ is an ion exchange component, and particularly, is an effective component for obtaining a large depth of layer, and is also a component that reduces the viscosity at high temperature to improve the meltability and the formability. Meanwhile, $Li_2O$ is a component that is eluted at the time of ion exchange treatment and degrades an ion exchange solution. Further, $Li_2O$ is a component that increases the Young's modulus. Accordingly, a suitable content of $Li_2O$ is from 0% to 15%, from 0% to 10%, from 0% to 7%, from 0% to 5%, from 0% to less than 3%, or from 0% to 2%, particularly from 0% to 1%. When $Li_2O$ is added, a suitable lower limit of the content range of $Li_2O$ is 0.01% or more, 0.1% or more, or 0.5% or more, particularly 1% or more.

$Na_2O$ is an ion exchange component, and is also a component that reduces the viscosity at high temperature to improve the meltability and the formability. In addition, $Na_2O$ is also a component that improves the devitrification resistance, including resistance to devitrification through a reaction with a forming body refractory, in particular, an alumina refractory. When the content of $Na_2O$ is too small, the meltability is reduced, the thermal expansion coefficient is reduced excessively, and the ion exchange rate is liable to be reduced. Accordingly, a suitable lower limit of the content range of $Na_2O$ is 1% or more, 5% or more, 6% or more, 7% or more, 8% or more, 9% or more, 10% or more, 11% or more, or 12% or more, particularly 13% or more. Meanwhile, when the content of $Na_2O$ is too large, the Young's modulus is increased, the acid resistance is reduced, and the glass composition loses its component balance, with the result that the devitrification resistance is reduced contrarily in some cases. Accordingly, a suitable upper limit of the content range of $Na_2O$ is 25% or less, 22% or less, 20% or less, 19.5% or less, 19% or less, 18% or less, 17% or less, 16.5% or less, 16% or less, or 15.5% or less, particularly 15% or less.

$K_2O$ is a component that reduces the viscosity at high temperature to improve the meltability and the formability. Further, $K_2O$ is also a component that improves the devitrification resistance. However, when the content of $K_2O$ is too large, the acid resistance is reduced, and the glass composition loses its component balance, with the result that the devitrification resistance tends to be reduced contrarily. Accordingly, a suitable upper limit of the content range of $K_2O$ is 10% or less, 8% or less, 6% or less, 4% or less, 3% or less, 2% or less, 1% or less, or 0.1% or less, particularly less than 0.1%.

$P_2O_5$ is a component that increases the ion exchange rate while maintaining a compressive stress value. $P_2O_5$ is also a component that reduces the Young's modulus. Further, $P_2O_3$ is a component that reduces the viscosity at high temperature to improve the meltability and the formability. However, when the content of $P_2O_5$ is too large, white turbidity resulting from phase separation occurs in the glass, and the acid resistance is liable to be reduced. Accordingly, a suitable upper limit of the content range of $P_2O_3$ is 15% or less, 12% or less, 10% or less, 8% or less, 6% or less, 5% or less, 4% or less, 3% or less, 2% or less, 1% or less, or 0.5% or less, particularly 0.1% or less. When $P_2O_5$ is added, a suitable lower limit of the content range of $P_2O_3$ is 0.1% or more, 0.5% or more, 1% or more, or 2% or more, particularly 3% or more.

A molar ratio $[Al_2O_3]/[Na_2O]$ is from 0.1 to 2.5, and $[SiO_2]-3\times[Al_2O_3]-[B_2O_3]-2\times[Li_2O]-1.5\times[Na_2O]-[K_2O]+1.2\times[P_2O_5]$ is preferably −20% or more, −15% or more, −10% or more, −5% or more, −2.5% or more, or −1% or more, particularly preferably from 0% to 35%. When the molar ratio $[Al_2O_3]/[Na_2O]$ is from 0.1 to 2.5 and $[SiO_2]-3\times[Al_2O_3]-[B_2O_3]-2\times[Li_2O]-1.5\times[Na_2O]-[K_2O]+1.2\times[P_2O_5]$ is too large, the acid resistance is reduced, and thus it becomes difficult to subject the glass to an acid treatment step.

The molar ratio $[Al_2O_3]/[Na_2O]$ is preferably from 0.1 to 2.5, from 0.2 to 2.2, from 0.3 to 1.8, from 0.4 to 1.5, from 0.5 to 1.2, from 0.6 to 1.1, or from 0.7 to 1.0, particularly preferably from 0.8 to 0.9. When the molar ratio $[Al_2O_3]/[Na_2O]$ is too large, the Young's modulus becomes too high. In addition, the devitrification resistance is liable to be reduced. Meanwhile, when the molar ratio $[Al_2O_3]/[Na_2O]$ is too small, the Young's modulus also becomes too high. In addition, the compressive stress value of a compressive stress layer on the outermost surface is liable to be reduced.

For example, the following components other than the above-mentioned components may be added.

MgO is a component that reduces the viscosity at high temperature to improve the meltability and the formability. In addition, MgO is also a component that enhances the acid resistance. However, when the content of MgO is too large, there are tendencies that the Young's modulus is increased, the ion exchange rate is reduced, and the glass devitrifies. Particularly when the glass is formed into a sheet shape by an overflow down-draw method involving using an alumina refractory as a forming body refractory, a devitrified crystal of spinel is liable to be precipitated at an interface with the alumina refractory. Accordingly, a suitable upper limit of the content range of MgO is 6% or less, 4.5% or less, 3% or less, 2% or less, or 1% or less, particularly 0.1% or less.

CaO is a component that reduces the viscosity at high temperature to improve the meltability and the formability without reducing the devitrification resistance as compared to other components, and has a high effect of increasing a strain point. However, when the content of CaO is too large, the Young's modulus is increased, the ion exchange rate is reduced, and the ion exchange solution is liable to be degraded. Accordingly, a suitable content of CaO is from 0% to 6%, from 0% to 5%, from 0% to 4%, from 0% to 3.5%, from 0% to 3%, from 0% to 2%, or from 0% to 1%, particularly from 0% to 0.5%.

SrO and BaO are each a component that reduces the viscosity at high temperature to improve the meltability and the formability, and increases the strain point. However, when the contents thereof are too large, the Young's modulus is increased, the ion exchange rate is reduced, the density and the thermal expansion coefficient are increased, and the glass is liable to devitrify. Accordingly, suitable contents of SrO and BaO are each from 0% to 2%, from 0% to 1.5%, from 0% to 1%, from 0% to 0.5%, or from 0% to 0.1%, particularly from 0% to less than 0.1%.

The total content of CaO, SrO, and BaO is preferably from 0% to 5%, from 0% to 2.5%, from 0% to 2%, from 0% to 1.5%, from 0% to 1%, from 0% to 0.5%, or from 0% to 0.1%, particularly preferably from 0% to less than 0.1%. When the total content of CaO, SrO, and BaO is too large, the Young's modulus is liable to be increased, and the ion exchange rate is liable to be reduced.

ZnO is a component that increases the ion exchange rate, and particularly, is a component that has a high effect of increasing the compressive stress value. In addition, ZnO is also a component that reduces the viscosity at high temperature without reducing viscosity at low temperature. However, when the content of ZnO is too large, there is a tendency that the glass undergoes phase separation, the devitrification resistance is reduced, the density is increased, or the depth of layer is reduced. Accordingly, a suitable content of ZnO is from 0% to 6% or from 0% to 3%, particularly from 0% to 1%.

$TiO_2$ is a component that increases the ion exchange rate, and is also a component that reduces the viscosity at high temperature. However, when the content of $TiO_2$ is too large, the glass is liable to be colored or devitrify. Accordingly, the content of $TiO_2$ is preferably from 0% to 4.5%, from 0% to less than 1%, or from 0% to 0.5%, particularly preferably from 0% to 0.3%.

$ZrO_2$ is a component that remarkably increases the ion exchange rate, and is also a component that increases viscosity around a liquidus viscosity and the strain point. However, when the content of $ZrO_2$ is too large, there is a risk in that the devitrification resistance may be remarkably reduced. There is also a risk in that the density may become too high. Accordingly, a suitable content of $ZrO_2$ is from 0% to 5%, from 0% to 4%, from 0% to 3%, or from 0% to 2%, particularly from 0% to less than 1%.

As a fining agent, one kind or two or more kinds selected from the group consisting of: $SnO_2$; $SO_3$; Cl; and $CeO_2$ (preferably the group consisting of: $SnO_2$; $SO_3$; and Cl) are preferably introduced. A suitable content of $SnO_2+SO_3+Cl$ is from 0.01% to 3%, from 0.05% to 3%, or from 0.1% to 3%, particularly from 0.2% to 3%. The "$SnO_2+SO_3+Cl$" represents the total content of $SnO_2$, $SO_3$, and Cl.

$Fe_2O_3$ is an impurity component from a raw material, but is a component that absorbs UV light having an adverse effect on a human eye. However, when the content of $Fe_2O_3$ is too large, coloring of the glass is strengthened. Accordingly, a suitable content of $Fe_2O_3$ is less than 1,000 ppm (0.1%), less than 800 ppm, less than 600 ppm, less than 400 ppm, less than 300 ppm, less than 250 ppm, less than 200 ppm, or less than 150 ppm, particularly less than 100 ppm.

A rare earth oxide, such as $Nd_2O_3$ or $La_2O_3$, is a component that increases the Young's modulus. However, the costs of raw materials therefor in itself are high. In addition, when the rare earth oxide is added in a large amount, the devitrification resistance is liable to be reduced. Accordingly, a suitable content of the rare earth oxide is 3% or less, 2% or less, 1% or less, or 0.5% or less, particularly 0.1% or less.

It is preferred that the tempered glass sheet (glass sheet to be tempered) be substantially free of $As_2O_3$, $Sb_2O_3$, PbO, F, and $Bi_2O_3$ in the glass composition from the standpoint of environmental considerations. The "substantially free of" has a concept in which the explicit component is not positively added as a glass component, but its incorporation at an impurity amount level is permitted, and specifically refers to the case in which the content of the explicit component is less than 0.05%.

The tempered glass sheet (glass sheet to be tempered) of the present invention preferably has, for example, the following characteristics.

A softening point is preferably 950° C. or less, 900° C. or less, 880° C. or less, 860° C. or less, particularly preferably from 700° C. to 850° C. As the softening point becomes lower, thermal processability is improved more, and a load on a glass manufacturing facility such as a thermal processing facility is alleviated more. Accordingly, as the softening point becomes lower, the manufacturing cost of a tempered glass can be more easily reduced.

A temperature at a viscosity at high temperature of $10^{2.5}$ dPa·s is preferably less than 1,650° C., 1,630° C. or less, or 1,620° C. or less, particularly preferably 1,610° C. or less. As the temperature at a viscosity at high temperature of $10^{2.5}$ dPa·s becomes lower, melting at low temperature is enabled, and hence a load on a glass manufacturing facility such as a melting furnace can be alleviated more, and bubble quality can be more easily enhanced. Accordingly, as the temperature at a viscosity at high temperature of $10^{2.5}$ dPa·s becomes lower, the manufacturing cost of the tempered glass can be more easily reduced.

The Young's modulus is preferably 70 GPa or less, 67 GPa or less, 65 GPa or less, or 64 GPa or less, particularly preferably from 50 GPa to 63 GPa. When the Young's modulus is too high, at the time of bending the flexible display, the tensile stress that is generated in a bent portion of the cover glass becomes high.

When the glass is immersed in a 5 mass % HCl aqueous solution warmed to 80° C. for 24 hours, a mass reduction amount per surface area is preferably 30 $mg/cm^2$ or less, 25 $mg/cm^2$ or less, 20 $mg/cm^2$ or less, or 15 $mg/cm^2$ or less, particularly preferably 10 $mg/cm^2$ or less. When the mass reduction amount is too large, white turbidity is liable to occur in the glass in the acid treatment step.

The liquidus viscosity in terms of Log ρ is preferably 4.0 dPa·s or more, 4.3 dPa·s or more, 4.5 dPa·s or more, 4.8 dPa·s or more, 5.1 dPa·s or more, or 5.3 dPa·s or more, particularly preferably 5.5 dPa·s or more. When the liquidus viscosity is too low, the devitrification resistance is reduced, and it becomes difficult to produce a glass sheet to be tempered, particularly a glass sheet to be tempered having a small sheet thickness by an overflow down-draw method or the like.

The tempered glass sheet of the present invention has a compressive stress layer in a surface thereof. The compressive stress value of the compressive stress layer on the outermost surface is preferably 200 MPa or more, 300 MPa or more, 400 MPa or more, or 500 MPa or more, particularly preferably 600 MPa or more. As the compressive stress value of the compressive stress layer on the outermost surface becomes larger, breakage resulting from a tensile stress that is generated in a bent portion of the cover glass at the time of bending the flexible display can be more easily prevented. Meanwhile, when an excessively large compressive stress is formed in the surface, an internal tensile stress of the tempered glass sheet is increased excessively, and there is a risk in that a dimensional change before and after ion exchange treatment may be increased. Accordingly, the compressive stress value of the compressive stress layer on the outermost surface is preferably 1,300 MPa or less, 1,100 MPa or less, or 900 MPa or less, particularly preferably 800 MPa or less.

The depth of layer is preferably 1 μm or more, 3 μm or more, 5 μm or more, 7 μm or more, 8 μm or more, or 9 μm or more, particularly preferably 10 μm or more, and is from 8% to 17%, from 10% to 15%, or from 11% to 14%, particularly preferably from 12% to 13% of a sheet thickness. As the depth of layer becomes larger, the tempered glass is less liable to be broken even when the tempered glass has a deep flaw, and variation in mechanical strength becomes smaller. Meanwhile, as the depth of layer becomes larger, the dimensional change before and after ion exchange treatment is more liable to be increased. Accordingly, the depth of layer is preferably 20 μm or less or 15 μm or less, particularly preferably 10 μm or less.

The internal tensile stress value is preferably 250 MPa or less, 220 MPa or less, 200 MPa or less, or 180 MPa or less, particularly preferably 170 MPa or less. When the internal tensile stress value is too high, the tempered glass sheet is liable to undergo self-destruction owing to physical collision or the like. Meanwhile, when the internal tensile stress value is too low, it becomes difficult to ensure the mechanical strength of the tempered glass sheet. The internal tensile stress value is preferably 60 MPa or more, 80 MPa or more, 100 MPa or more, 125 MPa or more, or 140 MPa or more, particularly preferably 150 MPa or more. The internal tensile stress may be calculated by the following mathematical expression 1.

$$\text{Internal tensile stress value} = (\text{compressive stress value of the compressive stress layer on the outermost surface} \times \text{depth of layer}) / (\text{sheet thickness} - 2 \times \text{depth of layer}) \qquad \text{[Math. 1]}$$

The tempered glass sheet (glass sheet to be tempered) of the present invention has a sheet thickness of preferably 200 μm or less, 150 μm or less, 100 μm or less, 80 μm or less, 60 μm or less, from 1 μm to 50 μm, or from 5 μm to 40 μm, particularly preferably from 10 μm to 30 μm. As the sheet thickness becomes smaller, flexibility of the cover glass is improved more, and hence the tempered glass sheet can be more easily applied to the flexible display. In addition, an allowable radius of curvature at the time of bending the cover glass becomes smaller. Further, the tempered glass sheet can be more easily taken up into a roll shape.

Dimensions are preferably a rectangular shape with a side of 100 mm or more, a rectangular shape with a side of 120 mm or more, or a rectangular shape with a side of 150 mm or more, particularly preferably from a rectangular shape with a side of 200 mm to 2,000 mm. When the dimensions become larger, the tempered glass sheet can be more easily applied to a large flexible display.

The glass sheet to be tempered of the present invention is characterized by comprising as a glass composition, in terms of mol %, 50% to 75% of $SiO_2$, 1% to 20% of $Al_2O_3$, 5% to 30% of $B_2O_3$, 1% to 25% of $Na_2O$, 0% to 10% of $K_2O$, and 0% to 15% of $P_2O_5$, having a molar ratio $[Al_2O_3]/[Na_2O]$ of from 0.1 to 2.5, and satisfying the following relationship:

$$[SiO_2]-3\times[Al_2O_3]-[B_2O_3]-2\times[Li_2O]-1.5\times[Na_2O]-[K_2O]+1.2\times[P_2O_5]\geq-20\%.$$

In addition, the glass sheet to be tempered of the present invention is characterized by comprising as a glass composition, in terms of mol %, 50% to 75% of $SiO_2$, 1% to 20% of $Al_2O_3$, 5% to 30% of $B_2O_3$, 1% to 25% of $Na_2O$, 0% to 10% of $K_2O$, and 0% to 15% of $P_2O_5$, having a molar ratio $[Al_2O_3]/[Na_2O]$ of from 0.1 to 2.5, satisfying the following relationship:

$$[SiO_2]-3\times[Al_2O_3]-[B_2O_3]-2\times[Li_2O]-1.5\times[Na_2O]-[K_2O]+1.2\times[P_2O_5]\geq-20\%,$$

and having a sheet thickness of less than 100 μm. The glass sheet to be tempered of the present invention has technical features in common with the technical features of the tempered glass sheet of the present invention, and hence the detailed description is omitted here.

The glass sheet to be tempered of the present invention may be produced as described below. As a preferred method, first, glass raw materials blended so as to give a desired glass composition are loaded into a continuous melting furnace, heated to be melted at 1,500° C. to 1,700° C., and fined. After that, the molten glass is supplied to a forming apparatus and formed into a sheet shape, followed by cooling. As a method of cut processing, into predetermined dimensions, the glass having been formed into a sheet shape, a well-known method may be adopted, but the cut processing is preferably performed by laser melt-cutting because an end surface becomes smooth.

At the time of forming of the molten glass, the molten glass is preferably cooled in a temperature region of from the annealing point of the molten glass to the strain point of the molten glass at a cooling rate of 3° C./min or more and less than 1,000° C./min. The cooling rate is preferably 10° C./min or more, 40° C./min or more, or 60° C./min or more, particularly preferably 100° C./min or more, and is preferably less than 1,000° C./min, or less than 800° C./min, particularly preferably less than 500° C./min. When the cooling rate is too low, it becomes difficult to obtain a small sheet thickness. Meanwhile, when the cooling rate is too high, the structure of the glass becomes rough, and hardness of the glass is liable to be reduced.

As a method of forming the molten glass into a sheet shape, an overflow down-draw method is preferably adopted. The overflow down-draw method is a method by which a high-quality glass sheet can be manufactured in a large amount and a thin glass sheet can also be easily manufactured. Further, while, in the overflow down-draw method, alumina or zirconia is used as the forming body refractory, the glass sheet to be tempered of the present invention has good compatibility with alumina or zirconia, particularly alumina, and hence hardly generates bubbles, stones, or the like through a reaction with the forming body.

Various forming methods other than the overflow down-draw method may also be adopted. For example, forming methods, such as a float method, a down-draw method (such as a slot down-draw method or a re-draw method), a roll out method, and a press method, may be adopted.

The tempered glass sheet of the present invention is manufactured by subjecting the glass sheet to be tempered to ion exchange treatment. The conditions of the ion exchange treatment are not particularly limited, and optimum conditions may be selected in consideration of the viscosity characteristics of the glass, a usage, a thickness, an internal tensile stress, a dimensional change, and the like. In particular, when a K ion in a $KNO_3$ molten salt is ion exchanged with a Na component in the glass, the compressive stress layer can be efficiently formed in the surface.

The number of times of the ion exchange treatment is not particularly limited, and the ion exchange treatment may be performed only once or a plurality of times. When the ion exchange treatment is performed once, the cost of the cover glass can be reduced. When the ion exchange treatment is performed a plurality of times, the ion exchange treatment is preferably performed twice. With this configuration, the total amount of the tensile stress accumulating in the glass can be reduced while the depth of layer is increased.

Example 1

The present invention is hereinafter described with reference to Examples. The following Examples are merely illustrative. The present invention is by no means limited to the following Examples.

Examples (Sample Nos. 1 to 76) of the present invention and Comparative Examples (Sample Nos. 77 and 78) are shown in Tables 1 to 8. In the tables, the "acid resistance indicator" represents "$[SiO_2]-3\times[Al_2O_3]-[B_2O_3]-2\times[Li_2O]-1.5\times[Na_2O]-[K_2O]+1.2\times[P_2O_5]$". In addition, the "N.A." represents "unmeasured".

Samples in the tables were each produced as described below. First, glass raw materials were blended so as to give a glass composition shown in the table, and were melted at 1,580° C. for 8 hours in a platinum pot. After that, the resultant molten glass was poured out on a carbon sheet and formed into a flat sheet shape, followed by being annealed. The obtained glass sheet to be tempered was evaluated for various characteristics. The results are shown in Tables 1 to 8.

TABLE 1

| (mol %) | No. 1 | No. 2 | No. 3 | No. 4 | No. 5 | No. 6 | No. 7 | No. 8 | No. 9 | No. 10 |
|---|---|---|---|---|---|---|---|---|---|---|
| $SiO_2$ | 64.86 | 63.91 | 59.54 | 58.66 | 69.80 | 66.80 | 66.80 | 63.80 | 63.80 | 63.80 |
| $Al_2O_3$ | 6.39 | 3.15 | 6.40 | 3.15 | 3.00 | 6.00 | 3.00 | 9.00 | 6.00 | 3.00 |
| $B_2O_3$ | 23.40 | 27.67 | 23.44 | 27.72 | 19.00 | 19.00 | 19.00 | 19.00 | 19.00 | 19.00 |
| $Li_2O$ | 0.00 | 0.00 | 0.00 | 0.00 | 0.00 | 0.00 | 0.00 | 0.00 | 0.00 | 0.00 |
| $Na_2O$ | 5.26 | 5.18 | 10.53 | 10.38 | 8.00 | 8.00 | 11.00 | 8.00 | 11.00 | 14.00 |
| $K_2O$ | 0.00 | 0.00 | 0.00 | 0.00 | 0.00 | 0.00 | 0.00 | 0.00 | 0.00 | 0.00 |
| MgO | 0.00 | 0.00 | 0.00 | 0.00 | 0.00 | 0.00 | 0.00 | 0.00 | 0.00 | 0.00 |
| CaO | 0.00 | 0.00 | 0.00 | 0.00 | 0.00 | 0.00 | 0.00 | 0.00 | 0.00 | 0.00 |
| SrO | 0.00 | 0.00 | 0.00 | 0.00 | 0.00 | 0.00 | 0.00 | 0.00 | 0.00 | 0.00 |
| BaO | 0.00 | 0.00 | 0.00 | 0.00 | 0.00 | 0.00 | 0.00 | 0.00 | 0.00 | 0.00 |
| $P_2O_5$ | 0.00 | 0.00 | 0.00 | 0.00 | 0.00 | 0.00 | 0.00 | 0.00 | 0.00 | 0.00 |
| $SnO_2$ | 0.09 | 0.09 | 0.09 | 0.09 | 0.17 | 0.17 | 0.17 | 0.17 | 0.17 | 0.17 |

TABLE 1-continued

| (mol %) | No. 1 | No. 2 | No. 3 | No. 4 | No. 5 | No. 6 | No. 7 | No. 8 | No. 9 | No. 10 |
|---|---|---|---|---|---|---|---|---|---|---|
| Molar ratio Al$_2$O$_3$/Na$_2$O | 1.22 | 0.61 | 0.61 | 0.30 | 0.38 | 0.75 | 0.27 | 1.13 | 0.55 | 0.21 |
| Acid resistance indicator (mol %) | 14.39 | 19.02 | 1.09 | 5.91 | 29.80 | 17.80 | 22.30 | 5.80 | 10.30 | 14.80 |
| Young's modulus (GPa) | 50 | 46 | 54 | 52 | 59 | 54 | 64 | 54 | 59 | N.A. |
| Ps (° C.) | 456 | 415 | 455 | 441 | 475 | 460 | 500 | 476 | 483 | 524 |
| Ta (° C.) | 511 | 462 | 499 | 483 | 519 | 508 | 541 | 529 | 526 | 562 |
| Ts (° C.) | 806 | 699 | 707 | 682 | 734 | 744 | 733 | 810 | 725 | 732 |
| 10$^{2.5}$ dPa · s (° C.) | 1,651 | 1,633 | 1,388 | 1,434 | 1,582 | 1,629 | 1,490 | 1,602 | 1,508 | 1,324 |
| Logη at TL (dPa · s) | 4.3 | 5.3 | 8.0 | 6.9 | 6.0 | 5.5 | 5.4 | 4.4 | 7.5 | 4.7 |
| Acid resistance (mg/cm$^3$) | 4.9 | 12.0 | 9.6 | 10.4 | 0.2 | 1.0 | 0.1 | 4.2 | 0.7 | 0.1 |
| CS (MPa) | N.A. | N.A. | N.A. | N.A. | N.A. | N.A. | 526 | N.A. | 373 | 555 |
| DOL (μm) | N.A. | N.A. | N.A. | N.A. | N.A. | N.A. | 6.5 | N.A. | 7.2 | 5.2 |

TABLE 2

| (mol %) | No. 11 | No. 12 | No. 13 | No. 14 | No. 15 | No. 16 | No. 17 | No. 18 | No. 19 | No. 20 |
|---|---|---|---|---|---|---|---|---|---|---|
| SiO$_2$ | 60.80 | 60.80 | 60.80 | 60.80 | 66.80 | 63.80 | 63.80 | 60.80 | 60.80 | 60.80 |
| Al$_2$O$_3$ | 12.00 | 9.00 | 6.00 | 3.00 | 3.00 | 6.00 | 3.00 | 9.00 | 6.00 | 3.00 |
| B$_2$O$_3$ | 19.00 | 19.00 | 19.00 | 19.00 | 22.00 | 22.00 | 22.00 | 22.00 | 22.00 | 22.00 |
| Li$_2$O | 0.00 | 0.00 | 0.00 | 0.00 | 0.00 | 0.00 | 0.00 | 0.00 | 0.00 | 0.00 |
| Na$_2$O | 8.00 | 11.00 | 14.00 | 17.00 | 8.00 | 8.00 | 11.00 | 8.00 | 11.00 | 14.00 |
| K$_2$O | 0.00 | 0.00 | 0.00 | 0.00 | 0.00 | 0.00 | 0.00 | 0.00 | 0.00 | 0.00 |
| MgO | 0.00 | 0.00 | 0.00 | 0.00 | 0.00 | 0.00 | 0.00 | 0.00 | 0.00 | 0.00 |
| CaO | 0.00 | 0.00 | 0.00 | 0.00 | 0.00 | 0.00 | 0.00 | 0.00 | 0.00 | 0.00 |
| SrO | 0.00 | 0.00 | 0.00 | 0.00 | 0.00 | 0.00 | 0.00 | 0.00 | 0.00 | 0.00 |
| BaO | 0.00 | 0.00 | 0.00 | 0.00 | 0.00 | 0.00 | 0.00 | 0.00 | 0.00 | 0.00 |
| P$_2$O$_5$ | 0.00 | 0.00 | 0.00 | 0.00 | 0.00 | 0.00 | 0.00 | 0.00 | 0.00 | 0.00 |
| SnO$_2$ | 0.17 | 0.17 | 0.17 | 0.17 | 0.17 | 0.17 | 0.17 | 0.17 | 0.17 | 0.17 |
| Molar ratio Al$_2$O$_3$/Na$_2$O | 1.50 | 0.82 | 0.43 | 0.18 | 0.38 | 0.75 | 0.27 | 1.13 | 0.55 | 0.21 |
| Acid resistance indicator (mol %) | −6.20 | −1.70 | 2.80 | 7.30 | 23.80 | 11.80 | 16.30 | −0.20 | 4.30 | 8.80 |
| Young's modulus (GPa) | 57 | 56 | 64 | N.A. | 56 | 52 | 61 | 52 | 57 | 66 |
| Ps (° C.) | 502 | 470 | 507 | 538 | 459 | 448 | 483 | 456 | 465 | 506 |
| Ta (° C.) | 553 | 516 | 546 | 573 | 503 | 494 | 524 | 506 | 508 | 544 |
| Ts (° C.) | 813 | 736 | 722 | 730 | 712 | 719 | 713 | 762 | 704 | 713 |
| 10$^{2.5}$ dPa · s (° C.) | 1,530 | 1,513 | 1,381 | 1,269 | 1,494 | 1,539 | 1,375 | 1,538 | 1,431 | 1,305 |
| Logη at TL (dPa · s) | 3.5 | 4.9 | 8.6 | 4.4 | 6.1 | 5.1 | 5.3 | 4.0 | 8.1 | 5.0 |
| Acid resistance (mg/cm$^3$) | 19.8 | 13.1 | 0.6 | 0.0 | 2.1 | 3.8 | 0.5 | 24.4 | 4.3 | 0.1 |
| CS (MPa) | N.A. | N.A. | 513 | 725 | N.A. | N.A. | N.A. | N.A. | N.A. | 431 |
| DOL (μm) | N.A. | N.A. | 6.9 | 6.7 | N.A. | N.A. | N.A. | N.A. | N.A. | 7.1 |

TABLE 3

| (mol %) | No. 21 | No. 22 | No. 23 | No. 24 | No. 25 | No. 26 | No. 27 | No. 28 | No. 29 | No. 30 |
|---|---|---|---|---|---|---|---|---|---|---|
| SiO$_2$ | 57.80 | 57.80 | 57.80 | 57.80 | 66.80 | 63.80 | 63.80 | 60.80 | 60.80 | 60.80 |
| Al$_2$O$_3$ | 12.00 | 9.00 | 6.00 | 3.00 | 3.00 | 6.00 | 3.00 | 9.00 | 6.00 | 3.00 |
| B$_2$O$_3$ | 22.00 | 22.00 | 22.00 | 22.00 | 25.00 | 25.00 | 25.00 | 25.00 | 25.00 | 25.00 |
| Li$_2$O | 0.00 | 0.00 | 0.00 | 0.00 | 0.00 | 0.00 | 0.00 | 0.00 | 0.00 | 0.00 |
| Na$_2$O | 8.00 | 11.00 | 14.00 | 17.00 | 5.00 | 5.00 | 8.00 | 5.00 | 8.00 | 11.00 |
| K$_2$O | 0.00 | 0.00 | 0.00 | 0.00 | 0.00 | 0.00 | 0.00 | 0.00 | 0.00 | 0.00 |
| MgO | 0.00 | 0.00 | 0.00 | 0.00 | 0.00 | 0.00 | 0.00 | 0.00 | 0.00 | 0.00 |
| CaO | 0.00 | 0.00 | 0.00 | 0.00 | 0.00 | 0.00 | 0.00 | 0.00 | 0.00 | 0.00 |
| SrO | 0.00 | 0.00 | 0.00 | 0.00 | 0.00 | 0.00 | 0.00 | 0.00 | 0.00 | 0.00 |
| BaO | 0.00 | 0.00 | 0.00 | 0.00 | 0.00 | 0.00 | 0.00 | 0.00 | 0.00 | 0.00 |
| P$_2$O$_5$ | 0.00 | 0.00 | 0.00 | 0.00 | 0.00 | 0.00 | 0.00 | 0.00 | 0.00 | 0.00 |
| SnO$_2$ | 0.17 | 0.17 | 0.17 | 0.17 | 0.17 | 0.17 | 0.17 | 0.17 | 0.17 | 0.17 |

TABLE 3-continued

| (mol %) | No. 21 | No. 22 | No. 23 | No. 24 | No. 25 | No. 26 | No. 27 | No. 28 | No. 29 | No. 30 |
|---|---|---|---|---|---|---|---|---|---|---|
| Molar ratio $Al_2O_3/Na_2O$ | 1.50 | 0.82 | 0.43 | 0.18 | 0.60 | 1.20 | 0.38 | 1.80 | 0.75 | 0.27 |
| Acid resistance indicator (mol %) | −12.20 | −7.70 | −3.20 | 1.30 | 25.30 | 13.30 | 17.80 | 1.30 | 5.80 | 10.30 |
| Young's modulus (GPa) | 55 | 55 | 62 | N.A. | 48 | 48 | 53 | 52 | 50 | 58 |
| Ps (° C.) | 486 | 457 | 490 | 523 | 425 | 440 | 444 | 461 | 435 | 465 |
| Ta (° C.) | 535 | 502 | 529 | 559 | 473 | 493 | 487 | 516 | 480 | 506 |
| Ts (° C.) | 780 | 713 | 704 | 718 | 716 | 781 | 700 | 829 | 702 | 693 |
| $10^{2.5}$ dPa · s (° C.) | 1,477 | 1,455 | 1,336 | 1,241 | 1,609 | 1,623 | 1,524 | 1,534 | 1,479 | 1,318 |
| Logη at TL (dPa · s) | N.A. | 4.5 | 7.1 | 4.7 | 4.9 | 4.3 | 8.0 | N.A. | 4.5 | 5.7 |
| Acid resistance (mg/cm³) | N.A. | N.A. | 4.0 | 0.0 | 4.1 | 7.3 | 4.8 | 22.6 | 15.5 | 4.0 |
| CS (MPa) | N.A. | N.A. | 414 | 454 | N.A. | N.A. | N.A. | N.A. | N.A. | N.A. |
| DOL (μm) | N.A. | N.A. | 7.8 | 6.7 | N.A. | N.A. | N.A. | N.A. | N.A. | N.A. |

TABLE 4

| (mol %) | No. 31 | No. 32 | No. 33 | No. 34 | No. 35 | No. 36 | No. 37 | No. 38 | No. 39 | No. 40 |
|---|---|---|---|---|---|---|---|---|---|---|
| $SiO_2$ | 57.80 | 57.80 | 57.80 | 57.80 | 72.80 | 69.80 | 66.80 | 63.80 | 69.80 | 66.80 |
| $Al_2O_3$ | 12.00 | 9.00 | 6.00 | 3.00 | 6.00 | 9.00 | 12.00 | 15.00 | 6.00 | 9.00 |
| $B_2O_3$ | 25.00 | 25.00 | 25.00 | 25.00 | 10.00 | 10.00 | 10.00 | 10.00 | 10.00 | 10.00 |
| $Li_2O$ | 0.00 | 0.00 | 0.00 | 0.00 | 0.00 | 0.00 | 0.00 | 0.00 | 0.00 | 0.00 |
| $Na_2O$ | 5.00 | 8.00 | 11.00 | 14.00 | 11.00 | 11.00 | 11.00 | 11.00 | 14.00 | 14.00 |
| $K_2O$ | 0.00 | 0.00 | 0.00 | 0.00 | 0.00 | 0.00 | 0.00 | 0.00 | 0.00 | 0.00 |
| MgO | 0.00 | 0.00 | 0.00 | 0.00 | 0.00 | 0.00 | 0.00 | 0.00 | 0.00 | 0.00 |
| CaO | 0.00 | 0.00 | 0.00 | 0.00 | 0.00 | 0.00 | 0.00 | 0.00 | 0.00 | 0.00 |
| SrO | 0.00 | 0.00 | 0.00 | 0.00 | 0.00 | 0.00 | 0.00 | 0.00 | 0.00 | 0.00 |
| BaO | 0.00 | 0.00 | 0.00 | 0.00 | 0.00 | 0.00 | 0.00 | 0.00 | 0.00 | 0.00 |
| $P_2O_5$ | 0.00 | 0.00 | 0.00 | 0.00 | 0.00 | 0.00 | 0.00 | 0.00 | 0.00 | 0.00 |
| $SnO_2$ | 0.17 | 0.17 | 0.17 | 0.17 | 0.17 | 0.17 | 0.17 | 0.17 | 0.17 | 0.17 |
| Molar ratio $Al_2O_3/Na_2O$ | 2.40 | 1.13 | 0.55 | 0.21 | 0.55 | 0.82 | 1.09 | 1.36 | 0.43 | 0.64 |
| Acid resistance indicator (mol %) | −10.70 | −6.20 | −1.70 | 2.80 | 28.30 | 16.30 | 4.30 | −7.70 | 20.80 | 8.80 |
| Young's modulus (GPa) | 56 | 50 | 55 | 64 | N.A. | 63 | 60 | 64 | N.A. | N.A. |
| Ps (° C.) | N.A. | 452 | 452 | 492 | 534 | 525 | 543 | 566 | 546 | 535 |
| Ta (° C.) | N.A. | 501 | 494 | 529 | 576 | 573 | 602 | 624 | 585 | 575 |
| Ts (° C.) | N.A. | 750 | 683 | 696 | 777 | 809 | 907 | 906 | 765 | 762 |
| $10^{2.5}$ dPa · s (° C.) | 1,446 | 1,497 | 1,346 | 1,247 | 1,572 | 1,674 | 1,704 | 1,629 | 1,522 | 1,526 |
| Logη at TL (dPa · s) | N.A. | 4.0 | 6.8 | 5.5 | 8.6 | 9.2 | 4.3 | 3.8 | 9.7 | 9.3 |
| Acid resistance (mg/cm³) | 24.7 | N.A. | 20.9 | 2.5 | 0.0 | 0.0 | 0.6 | 4.3 | 0.0 | 0.1 |
| CS (MPa) | N.A. | N.A. | N.A. | 442 | 639 | 621 | 623 | 725 | 737 | 805 |
| DOL (μm) | N.A. | N.A. | N.A. | 7.3 | 6.4 | 5.8 | 7.1 | 6.0 | 5.7 | 6.8 |

TABLE 5

| (mol %) | No. 41 | No. 42 | No. 43 | No. 44 | No. 45 | No. 46 | No. 47 | No. 48 | No. 49 | No. 50 |
|---|---|---|---|---|---|---|---|---|---|---|
| $SiO_2$ | 64.80 | 66.80 | 63.80 | 63.80 | 72.80 | 69.80 | 66.80 | 63.80 | 69.80 | 66.80 |
| $Al_2O_3$ | 12.00 | 6.00 | 9.00 | 6.00 | 6.00 | 9.00 | 12.00 | 15.00 | 6.00 | 9.00 |
| $B_2O_3$ | 9.00 | 10.00 | 10.00 | 10.00 | 13.00 | 13.00 | 13.00 | 13.00 | 13.00 | 13.00 |
| $Li_2O$ | 0.00 | 0.00 | 0.00 | 0.00 | 0.00 | 0.00 | 0.00 | 0.00 | 0.00 | 0.00 |
| $Na_2O$ | 14.00 | 17.00 | 17.00 | 20.00 | 8.00 | 8.00 | 8.00 | 8.00 | 11.00 | 11.00 |
| $K_2O$ | 0.00 | 0.00 | 0.00 | 0.00 | 0.00 | 0.00 | 0.00 | 0.00 | 0.00 | 0.00 |
| MgO | 0.00 | 0.00 | 0.00 | 0.00 | 0.00 | 0.00 | 0.00 | 0.00 | 0.00 | 0.00 |
| CaO | 0.00 | 0.00 | 0.00 | 0.00 | 0.00 | 0.00 | 0.00 | 0.00 | 0.00 | 0.00 |
| SrO | 0.00 | 0.00 | 0.00 | 0.00 | 0.00 | 0.00 | 0.00 | 0.00 | 0.00 | 0.00 |
| BaO | 0.00 | 0.00 | 0.00 | 0.00 | 0.00 | 0.00 | 0.00 | 0.00 | 0.00 | 0.00 |
| $P_2O_5$ | 0.00 | 0.00 | 0.00 | 0.00 | 0.00 | 0.00 | 0.00 | 0.00 | 0.00 | 0.00 |
| $SnO_2$ | 0.20 | 0.17 | 0.17 | 0.17 | 0.17 | 0.17 | 0.17 | 0.17 | 0.17 | 0.17 |

TABLE 5-continued

| (mol %) | No. 41 | No. 42 | No. 43 | No. 44 | No. 45 | No. 46 | No. 47 | No. 48 | No. 49 | No. 50 |
|---|---|---|---|---|---|---|---|---|---|---|
| Molar ratio $Al_2O_3/Na_2O$ | 0.86 | 0.35 | 0.53 | 0.30 | 0.75 | 1.13 | 1.50 | 1.88 | 0.55 | 0.82 |
| Acid resistance indicator (mol %) | −1.20 | 13.30 | 1.30 | 5.80 | 29.80 | 17.80 | 5.80 | −6.20 | 22.30 | 10.30 |
| Young's modulus (GPa) | 63 | N.A. | N.A. | N.A. | 60 | 57 | 61 | 65 | 67 | 60 |
| Ps (° C.) | 530 | 542 | 534 | 524 | 497 | 511 | 538 | 565 | 518 | 505 |
| Ta (° C.) | 575 | 580 | 570 | 558 | 547 | 571 | 597 | 621 | 560 | 552 |
| Ts (° C.) | 796 | 751 | 735 | 711 | 791 | 894 | 893 | 889 | 758 | 782 |
| $10^{2.5}$ dPa · s (° C.) | 1,603 | 1,481 | 1,448 | 1,288 | 1,699 | 1,740 | 1,658 | 1,576 | 1,522 | 1,636 |
| Logη at TL (dPa · s) | 5.6 | 8.4 | 7.8 | 7.4 | 8.7 | 4.4 | 3.9 | 3.6 | 8.4 | 9.5 |
| Acid resistance (mg/cm³) | 5.1 | 0.0 | 0.4 | 0.1 | 0.0 | 0.2 | 0.7 | 3.3 | 0.0 | 0.3 |
| CS (MPa) | 771 | 674 | 870 | 694 | 369 | 381 | 447 | 538 | 567 | 507 |
| DOL (μm) | 7.5 | 7.1 | 7.2 | 5.6 | 8.5 | 6.5 | 6.4 | 7.1 | 8.9 | 9.2 |

TABLE 6

| (mol %) | No. 51 | No. 52 | No. 53 | No. 54 | No. 55 | No. 56 | No. 57 | No. 58 | No. 59 | No. 60 |
|---|---|---|---|---|---|---|---|---|---|---|
| $SiO_2$ | 63.80 | 66.80 | 63.80 | 63.80 | 69.80 | 66.80 | 63.80 | 60.80 | 66.80 | 63.80 |
| $Al_2O_3$ | 12.00 | 6.00 | 9.00 | 6.00 | 6.00 | 9.00 | 12.00 | 15.00 | 6.00 | 9.00 |
| $B_2O_3$ | 13.00 | 13.00 | 13.00 | 13.00 | 16.00 | 16.00 | 16.00 | 16.00 | 16.00 | 16.00 |
| $Li_2O$ | 0.00 | 0.00 | 0.00 | 0.00 | 0.00 | 0.00 | 0.00 | 0.00 | 0.00 | 0.00 |
| $Na_2O$ | 11.00 | 14.00 | 14.00 | 17.00 | 8.00 | 8.00 | 8.00 | 8.00 | 11.00 | 11.00 |
| $K_2O$ | 0.00 | 0.00 | 0.00 | 0.00 | 0.00 | 0.00 | 0.00 | 0.00 | 0.00 | 0.00 |
| MgO | 0.00 | 0.00 | 0.00 | 0.00 | 0.00 | 0.00 | 0.00 | 0.00 | 0.00 | 0.00 |
| CaO | 0.00 | 0.00 | 0.00 | 0.00 | 0.00 | 0.00 | 0.00 | 0.00 | 0.00 | 0.00 |
| SrO | 0.00 | 0.00 | 0.00 | 0.00 | 0.00 | 0.00 | 0.00 | 0.00 | 0.00 | 0.00 |
| BaO | 0.00 | 0.00 | 0.00 | 0.00 | 0.00 | 0.00 | 0.00 | 0.00 | 0.00 | 0.00 |
| $P_2O_5$ | 0.00 | 0.00 | 0.00 | 0.00 | 0.00 | 0.00 | 0.00 | 0.00 | 0.00 | 0.00 |
| $SnO_2$ | 0.17 | 0.17 | 0.17 | 0.17 | 0.17 | 0.17 | 0.17 | 0.17 | 0.17 | 0.17 |
| Molar ratio $Al_2O_3/Na_2O$ | 1.09 | 0.43 | 0.64 | 0.35 | 0.75 | 1.13 | 1.50 | 1.88 | 0.55 | 0.82 |
| Acid resistance indicator (mol %) | −1.70 | 14.80 | 2.80 | 7.30 | 23.80 | 11.80 | −0.20 | −12.20 | 16.30 | 4.30 |
| Young's modulus (GPa) | 59 | N.A. | 67 | N.A. | 57 | 55 | 59 | 63 | 64 | 58 |
| Ps (° C.) | 518 | 532 | 520 | 534 | 477 | 492 | 523 | 551 | 500 | 485 |
| Ta (° C.) | 573 | 570 | 558 | 568 | 526 | 549 | 578 | 604 | 541 | 531 |
| Ts (° C.) | 860 | 738 | 737 | 722 | 767 | 851 | 856 | 864 | 733 | 754 |
| $10^{2.5}$ dPa · s (° C.) | 1,619 | 1,382 | 1,453 | 1,294 | 1,644 | 1,688 | 1,602 | 1,523 | 1,413 | 1,579 |
| Logη at TL (dPa · s) | 4.1 | 8.8 | 7.8 | N.A. | 9.1 | 4.6 | 3.5 | N.A. | 8.5 | 9.0 |
| Acid resistance (mg/cm³) | 4.5 | 0.0 | 1.5 | N.A. | 0.1 | 0.8 | 3.5 | 7.6 | 0.2 | 3.0 |
| CS (MPa) | 546 | 800 | 733 | 840 | N.A. | N.A. | 426 | 513 | 502 | 411 |
| DOL (μm) | 5.3 | 6.7 | 6.8 | 8.1 | N.A. | N.A. | 6.0 | 5.8 | 7.7 | 6.2 |

TABLE 7

| (mol %) | No. 61 | No. 62 | No. 63 | No. 64 | No. 65 | No. 66 | No. 67 | No. 68 | No. 69 | No. 70 |
|---|---|---|---|---|---|---|---|---|---|---|
| $SiO_2$ | 60.80 | 63.80 | 60.80 | 60.80 | 63.80 | 63.80 | 63.80 | 63.80 | 62.30 | 60.80 |
| $Al_2O_3$ | 12.00 | 6.00 | 9.00 | 6.00 | 12.30 | 13.00 | 13.60 | 14.20 | 12.00 | 12.00 |
| $B_2O_3$ | 16.00 | 16.00 | 16.00 | 16.00 | 10.00 | 10.00 | 10.00 | 10.00 | 10.00 | 10.00 |
| $Li_2O$ | 0.00 | 0.00 | 0.00 | 0.00 | 0.00 | 0.00 | 0.00 | 0.00 | 0.00 | 0.00 |
| $Na_2O$ | 11.00 | 14.00 | 14.00 | 17.00 | 13.70 | 13.00 | 12.40 | 11.80 | 14.00 | 14.00 |
| $K_2O$ | 0.00 | 0.00 | 0.00 | 0.00 | 0.00 | 0.00 | 0.00 | 0.00 | 0.00 | 0.00 |
| MgO | 0.00 | 0.00 | 0.00 | 0.00 | 0.00 | 0.00 | 0.00 | 0.00 | 0.00 | 0.00 |
| CaO | 0.00 | 0.00 | 0.00 | 0.00 | 0.00 | 0.00 | 0.00 | 0.00 | 0.00 | 0.00 |
| SrO | 0.00 | 0.00 | 0.00 | 0.00 | 0.00 | 0.00 | 0.00 | 0.00 | 0.00 | 0.00 |
| BaO | 0.00 | 0.00 | 0.00 | 0.00 | 0.00 | 0.00 | 0.00 | 0.00 | 0.00 | 0.00 |
| $P_2O_5$ | 0.00 | 0.00 | 0.00 | 0.00 | 0.00 | 0.00 | 0.00 | 0.00 | 1.50 | 3.00 |
| $SnO_2$ | 0.17 | 0.17 | 0.17 | 0.17 | 0.17 | 0.17 | 0.17 | 0.17 | 0.17 | 0.17 |

TABLE 7-continued

| (mol %) | No. 61 | No. 62 | No. 63 | No. 64 | No. 65 | No. 66 | No. 67 | No. 68 | No. 69 | No. 70 |
|---|---|---|---|---|---|---|---|---|---|---|
| Molar ratio $Al_2O_3/Na_2O$ | 1.09 | 0.43 | 0.64 | 0.35 | 0.90 | 1.00 | 1.10 | 1.20 | 0.86 | 0.86 |
| Acid resistance indicator (mol %) | −7.70 | 8.80 | −3.20 | 1.30 | −3.65 | −4.70 | −5.60 | −6.50 | −2.90 | −2.60 |
| Young's modulus (GPa) | 57 | N.A. | 64 | N.A. | 62 | 61 | 62 | 63 | 62 | 60 |
| Ps (° C.) | 496 | 521 | 504 | 529 | 530 | 538 | 545 | 555 | 520 | 510 |
| Ta (° C.) | 549 | 558 | 543 | 562 | 578 | 593 | 603 | 613 | 566 | 557 |
| Ts (° C.) | 819 | 723 | 720 | 710 | 815 | 877 | 894 | 904 | 802 | 796 |
| $10^{2.5}$ dPa · s (° C.) | 1,565 | 1,320 | 1,386 | 1,227 | 1,601 | 1,615 | 1,617 | 1,613 | 1,583 | 1,561 |
| Logη at TL (dPa · s) | 4.4 | 8.4 | 8.5 | 8.2 | 9.5 | 4.5 | 4.5 | 4.2 | 9.4 | 9.0 |
| Acid resistance (mg/cm³) | N.A. | 0.3 | 13.8 | 0.9 | 5.7 | 7.6 | 6.4 | 5.2 | 6.4 | 7.9 |
| CS(MPa) | 465 | 697 | 673 | 924 | 772 | 744 | 742 | 749 | 691 | 598 |
| DOL(μm) | 8.2 | 7.6 | 7.5 | 6.0 | 6.6 | 6.1 | 7.8 | 8.4 | 5.6 | 6.8 |

TABLE 8

| (mol %) | No. 71 | No. 72 | No. 73 | No. 74 | No. 75 | No. 76 | No. 77 | No. 78 |
|---|---|---|---|---|---|---|---|---|
| $SiO_2$ | 59.30 | 57.80 | 64.30 | 64.30 | 63.80 | 56.90 | 59.50 | 72.10 |
| $Al_2O_3$ | 12.00 | 12.00 | 12.00 | 12.00 | 12.00 | 16.30 | 22.00 | 0.70 |
| $B_2O_3$ | 10.00 | 10.00 | 9.00 | 9.00 | 9.00 | 0.00 | 10.00 | 12.00 |
| $Li_2O$ | 0.00 | 0.00 | 0.00 | 0.50 | 1.00 | 0.00 | 0.00 | 0.00 |
| $Na_2O$ | 14.00 | 14.00 | 14.00 | 14.00 | 14.00 | 17.30 | 8.30 | 15.00 |
| $K_2O$ | 0.00 | 0.00 | 0.00 | 0.00 | 0.00 | 0.00 | 0.00 | 0.00 |
| MgO | 0.00 | 0.00 | 0.00 | 0.00 | 0.00 | 2.70 | 0.00 | 0.00 |
| CaO | 0.00 | 0.00 | 0.00 | 0.00 | 0.00 | 0.00 | 0.00 | 0.00 |
| SrO | 0.00 | 0.00 | 0.00 | 0.00 | 0.00 | 0.00 | 0.00 | 0.00 |
| BaO | 0.00 | 0.00 | 0.00 | 0.00 | 0.00 | 0.00 | 0.00 | 0.00 |
| $P_2O_5$ | 4.50 | 6.00 | 0.50 | 0.00 | 0.00 | 6.70 | 0.00 | 0.00 |
| $SnO_2$ | 0.17 | 0.17 | 0.20 | 0.20 | 0.20 | 0.10 | 0.20 | 0.20 |
| Molar ratio $Al_2O_3/Na_2O$ | 0.86 | 0.86 | 0.86 | 0.86 | 0.86 | 0.94 | 2.65 | 0.05 |
| Acid resistance indicator (mol %) | −2.30 | −2.00 | −1.10 | −2.70 | −4.20 | −9.90 | −28.95 | 35.50 |
| Young's modulus (GPa) | 59 | 58 | 62 | 64 | 65 | 64 | 75 | 76 |
| Ps (° C.) | 503 | 493 | 521 | 526 | 522 | 595 | 545 | 412 |
| Ta (° C.) | 549 | 539 | 568 | 571 | 567 | 647 | 625 | 465 |
| Ts (° C.) | 785 | 774 | 789 | 793 | 788 | 911 | 960 | 701 |
| $10^{2.5}$ dPa · s (° C.) | 1,557 | 1,537 | 1,596 | 1,595 | 1,592 | 1,593 | 1,721 | 1,123 |
| Logη at TL (dPa · s) | 9.1 | 8.7 | 5.4 | 5.3 | 5.4 | 6.8 | 2.7 | 5.3 |
| Acid resistance (mg/cm³) | 10.3 | 11.3 | 5.4 | 5.3 | 4.8 | 28.3 | 31.3 | 0.3 |
| CS (MPa) | 539 | 461 | 720 | 750 | 739 | 900 | 860 | 287 |
| DOL (μm) | 6.1 | 7.4 | 5.9 | 6.0 | 6.3 | 64.0 | 7.1 | 3.8 |

The Young's modulus refers to a value measured by a well-known resonance method.

The strain point Ps and the annealing point Ta refer to values measured by a well-known fiber elongation method. The softening point Ts refers to a value measured by a method of ASTM C338.

The temperature at a viscosity at high temperature of $10^{2.5}$ dPa·s refers to a value measured by a platinum sphere pull up method.

The liquidus viscosity log η at TL is a value for a viscosity of the glass at the liquidus temperature measured by a platinum sphere pull up method. The liquidus temperature is a temperature at which a crystal precipitates after glass powder that has passed through a standard 30-mesh sieve (500 μm) and remains on a 50-mesh sieve (300 μm) is placed in a platinum boat and kept for 24 hours in a temperature gradient furnace.

The acid resistance test is evaluated as described below. A sample having been subjected to mirror processing on both sides so as to give dimensions of 50 mm×10 mm×1.0 mm in thickness was used as a measurement sample. The sample was sufficiently washed with a neutral detergent and pure water, and was then immersed in a 5 mass % HCl aqueous solution warmed to 80° C. for 24 hours. A mass reduction (mg/cm²) per unit surface area before and after the immersion was calculated.

Next, both surfaces of each sample were optically polished so as to give a sheet thickness of 1.5 mm, and then the sample was subjected to ion exchange treatment by being immersed in a $KNO_3$ molten salt at 430° C. for 4 hours. After the ion exchange treatment, the surfaces of each sample were washed. Subsequently, the compressive stress value and the depth of layer of the compressive stress layer on the outermost surface were calculated based on the number of interference fringes observed with a surface stress meter (FSM-6000 manufactured by Orihara Industrial Co., Ltd.) and intervals therebetween. In the calculation, the refractive index and the optical elastic constant of each sample were set to 1.51 and 37.2 [(nm/cm)/MPa], respectively. Although the glass composition in a surface layer of the glass microscopically varies before and after the ion exchange treatment, the glass composition does not substantially vary as a whole of the glass.

As apparent from the tables, Sample Nos. 1 to 76 each had a low Young's modulus and high acid resistance. Meanwhile, Sample No. 77 had a large content of $Al_2O_3$, a large molar ratio $Al_2O_3/Na_2O$, and a small acid resistance indicator, and hence had a high Young's modulus, low acid resistance, and a low liquidus viscosity. Sample No. 78 had a small molar ratio $Al_2O_3/Na_2O$, and hence had a high Young's modulus and a low compressive stress value.

Example 2

A glass batch for achieving the glass composition of Sample No. 41 shown in the table was melted in a test melting furnace to provide molten glass, followed by forming thereof into a glass sheet to be tempered having a sheet thickness of 50 μm by an overflow down-draw method. In the forming of the glass sheet to be tempered, the speed of drawing rollers, the speed of cooling rollers, the temperature distribution of a heating apparatus, the temperature of the molten glass, the flow rate of the molten glass, a sheet-drawing speed, the rotation number of a stirrer, and the like were appropriately adjusted to adjust the sheet thickness of the glass sheet to be tempered. Next, the resultant glass sheet to be tempered was cut into a predetermined size, and then subjected to ion exchange treatment by being immersed in a $KNO_3$ molten salt at 430° C. for 4 hours or a $KNO_3$ molten salt at 390° C. for 2.5 hours, to provide a tempered glass sheet.

Example 3

A glass batch for achieving the glass composition of Sample No. 41 shown in the table was melted in a test melting furnace to provide molten glass, followed by forming thereof into a glass sheet to be tempered having a sheet thickness of 100 μm by an overflow down-draw method. In the forming of the glass sheet to be tempered, the speed of drawing rollers, the speed of cooling rollers, the temperature distribution of a heating apparatus, the temperature of the molten glass, the flow rate of the molten glass, a sheet-drawing speed, the rotation number of a stirrer, and the like were appropriately adjusted to adjust the sheet thickness of the glass sheet to be tempered. Next, the resultant glass sheet to be tempered was cut into a predetermined size, and then subjected to ion exchange treatment by being immersed in a $KNO_3$ molten salt at 430° C. for 4 hours or a $KNO_3$ molten salt at 390° C. for 2.5 hours, to provide a tempered glass sheet.

Example 4

A glass batch for achieving the glass composition of Sample No. 41 shown in the table was melted in a test

Example 5

Glass raw materials were blended so as to give a glass composition of Sample No. 41 shown in the table, and were melted at 1,580° C. for 8 hours in a platinum pot. After that, the resultant molten glass was poured out on a carbon sheet and formed into a flat sheet shape, followed by being annealed. The resultant glass having a flat sheet shape was subjected to grinding and polishing to provide a sheet-shaped glass having a sheet thickness of 0.5 mm, followed by slimming in an etching step with hydrofluoric acid to provide a glass sheet to be tempered having a sheet thickness of 75 μm. Next, the resultant glass sheet to be tempered was cut into a predetermined size, and then subjected to ion exchange treatment by being immersed in a $KNO_3$ molten salt at 390° C. for 2.5 hours to provide a tempered glass sheet. The tempered glass sheet had a compressive stress value of 763 MPa and a depth of layer of the compressive stress layer of 15.6 μm, and underwent breakage at a bending radius R of 2.3 mm in a strength test by a two-point bending test. In the two-point bending test, a sample having a size of 20 mm×130 mm was used as a measurement sample, and was deformed by bending in a long-axis direction and reduced in bending radius R until its fracture. The measurement results for 15 sheets were recorded, and an average value thereof was adopted as an evaluation result.

Example 6

Glass raw materials were blended so as to give a glass composition of Sample No. 76 shown in the table, and were melted at 1,580° C. for 8 hours in a platinum pot. After that, the resultant molten glass was poured out on a carbon sheet and formed into a flat sheet shape, followed by being annealed. The resultant glass having a flat sheet shape was subjected to grinding and polishing to provide a sheet-shaped glass having a sheet thickness of 0.5 mm, followed by slimming in an etching step with hydrofluoric acid to provide a glass sheet to be tempered having a sheet thickness of 55 μm. Next, the resultant glass sheet to be tempered was cut into a predetermined size, and then subjected to ion exchange treatment by being immersed in a $KNO_3$ molten salt at 390° C. for 15 minutes to provide a tempered glass sheet. The tempered glass sheet had a compressive stress value of 832 MPa and a depth of layer of the compressive stress layer of 10.3 μm, and underwent breakage at a bending radius R of 1.8 mm in a strength test by a two-point bending test. In the two-point bending test, a sample having a size of 20 mm×130 mm was used as a measurement sample, and was deformed by bending in a long-axis direction and reduced in bending radius R until its fracture. The measurement results for 15 sheets were recorded, and an average value thereof was adopted as an evaluation result.

INDUSTRIAL APPLICABILITY

The tempered glass sheet and the glass sheet to be tempered of the present invention are suitable as a cover glass for a foldable display or the like. In addition, the tempered glass sheet and the glass sheet to be tempered are also suitable as a cover glass for a cellular phone, a digital camera, a PDA, or the like, or a glass substrate for a touch panel display or the like.

The invention claimed is:

1. A tempered glass sheet having a compressive stress layer in a surface thereof, wherein the tempered glass sheet comprises as a glass composition, in terms of mol %, 50% to 75% of $SiO_2$, 1% to 20% of $Al_2O_3$, 16% to 13% to 30% of $B_2O_3$, 0% to 1% of $Li_2O$, 1% to 25% of $Na_2O$, 0% to 10% of $K_2O$, and 0% to 15% of $P_2O_5$, wherein the tempered glass sheet has a sheet thickness of 80 μm or less, wherein the tempered glass sheet has an internal tensile stress value that is 60 MPa or more, wherein the tempered glass sheet has a Young's modulus of 67 GPa or less, wherein the tempered glass sheet has a molar ratio $[Al_2O_3]/[Na_2O]$ of from 0.1 to 2.5, and wherein the tempered glass sheet satisfies the following molar relationship:

$$[SiO_2]-3\times[Al_2O_3]-[B_2O_3]-2\times[Li_2O]-1.5\times[Na_2O]-[K_2O]+1.2\times[P_2O_5]\geq-20\%.$$

2. The tempered glass sheet according to claim 1, the tempered glass sheet having a compressive stress layer in a surface thereof, wherein the tempered glass sheet comprises as a glass composition, in terms of mol %, 50% to 75% of $SiO_2$, 11.7% to 13.5% of $Al_2O_3$, 16% to 30% of $B_2O_3$, 0% to 1% of $Li_2O$, 13% to 16% of $Na_2O$, 0% to 10% of $K_2O$, and 0% to 15% of $P_2O_5$, wherein the tempered glass sheet has a molar ratio $[Al_2O_3]/[Na_2O]$ of from 0.8 to 1.2, and wherein the tempered glass sheet satisfies the following molar relationship:

$$[SiO_2]-3\times[Al_2O_3]-[B_2O_3]-2\times[Li_2O]-1.5\times[Na_2O]-[K_2O]+1.2\times[P_2O_5]\geq-2.5\%.$$

3. The tempered glass sheet according to claim 1, wherein the tempered glass sheet has a content of $P_2O_5$ of from 0.1 mol % to 15 mol %.

4. The tempered glass sheet according to claim 1, wherein the tempered glass sheet has a content of $Li_2O$ of from 0.1 mol % to 1 mol %.

5. The tempered glass sheet according to claim 1, wherein the tempered glass sheet has a softening point of 950° C. or less.

6. The tempered glass sheet according to claim 1, wherein the tempered glass sheet has a temperature at a viscosity at high temperature of 102.5 dPa's of less than 1,650° C.

7. The tempered glass sheet according to claim 1, wherein the tempered glass sheet has dimensions of rectangular shape with a side of 100 mm or more.

8. The tempered glass sheet according to claim 1, wherein the compressive stress layer has a compressive stress value of from 200 MPa to 1,100 MPa on an outermost surface.

9. The tempered glass sheet according to claim 1, wherein the compressive stress layer has a depth of layer of from 10% to 15% of a sheet thickness.

10. The tempered glass sheet according to claim 1, wherein the tempered glass sheet comprises overflow-merged surfaces in a middle portion thereof in a sheet thickness direction.

11. The tempered glass sheet according to claim 1, wherein the tempered glass sheet is used as a cover glass for a flexible display.

12. The tempered glass sheet according to claim 1, wherein the tempered glass sheet has a content of $B_2O_3$ of from 19 mol % to 30 mol %.

13. The tempered glass sheet according to claim 2, wherein the tempered glass sheet has a content of $B_2O_3$ of from 19 mol % to 30 mol %.

14. The tempered glass sheet according to claim 1, wherein the tempered glass sheet has a content of $B_2O_3$ of from 22 mol % to 30 mol %.

15. The tempered glass sheet according to claim 2, wherein the tempered glass sheet has a content of $B_2O_3$ of from 22 mol % to 30 mol %.

* * * * *